Figure 3:
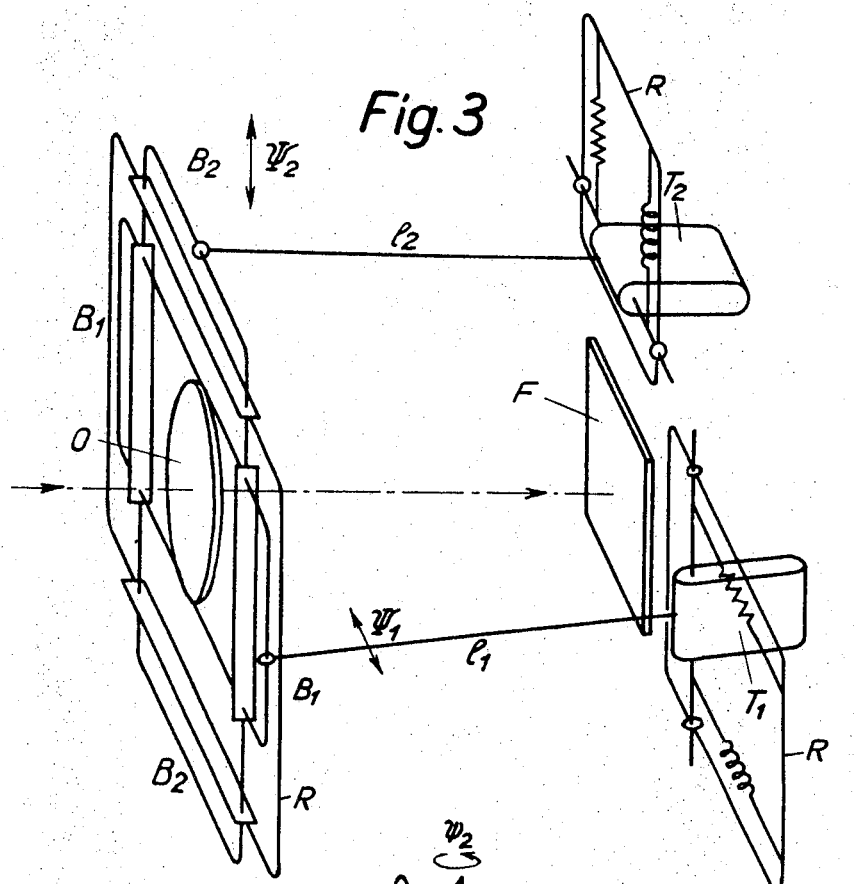

United States Patent

[11] 3,582,180

[72] Inventor Daniel Gross
 40 Route des Acacias, CH1211 Geneva, Switzerland
[21] Appl. No. 777,539
[22] Filed Sept. 30, 1968
[45] Patented June 1, 1971
[32] Priority Dec. 21, 1965
[33] Switzerland
[31] 17,701/65
 Continuation-in-part of application Ser. No. 602,340, Dec. 16, 1966, now abandoned.

[54] DEVICE FOR STABILIZING THE IMAGES OF OPTICAL INSTRUMENTS AGAINST MOVEMENT CAUSED BY VIBRATION OF THE INSTRUMENT
3 Claims, 12 Drawing Figs.

[52] U.S. Cl. .................................................. 350/16, 350/36
[51] Int. Cl. ............................................................ G02b 23/02
[50] Field of Search ........................................... 350/16; 356/250, 149

[56] References Cited
UNITED STATES PATENTS

| | | | |
|---|---|---|---|
| 2,427,130 | 9/1947 | Ford ............................. | 350/16 |
| 2,427,158 | 9/1947 | Poitras et al. ................. | 350/16 |
| 2,684,007 | 7/1954 | Newell ......................... | 350/16 |
| 2,779,231 | 1/1957 | Drodofsky .................... | 356/250 |
| 2,829,557 | 4/1958 | Jensen .......................... | 350/16 |
| 2,939,363 | 6/1960 | Kaestner ...................... | 350/16 |

FOREIGN PATENTS

| 341,007 | 10/1959 | Switzerland ................. | 356/250 |
|---|---|---|---|

*Primary Examiner*—David H. Rubin
*Attorney*—Browdy and Neimark

ABSTRACT: The device for stabilizing the images of optical instruments against movement caused by vibration of the instrument includes one or more inertia optical systems located in the optical path of the instrument and mounted on the instrument for free movement in one or more degrees of rotational and/or translational freedom. An elastic and attenuating coupling connects the inertial optical system to the instrument so that the former moves with the latter during the slow movements required to locate and retain objects within the field of view of the optical instrument.

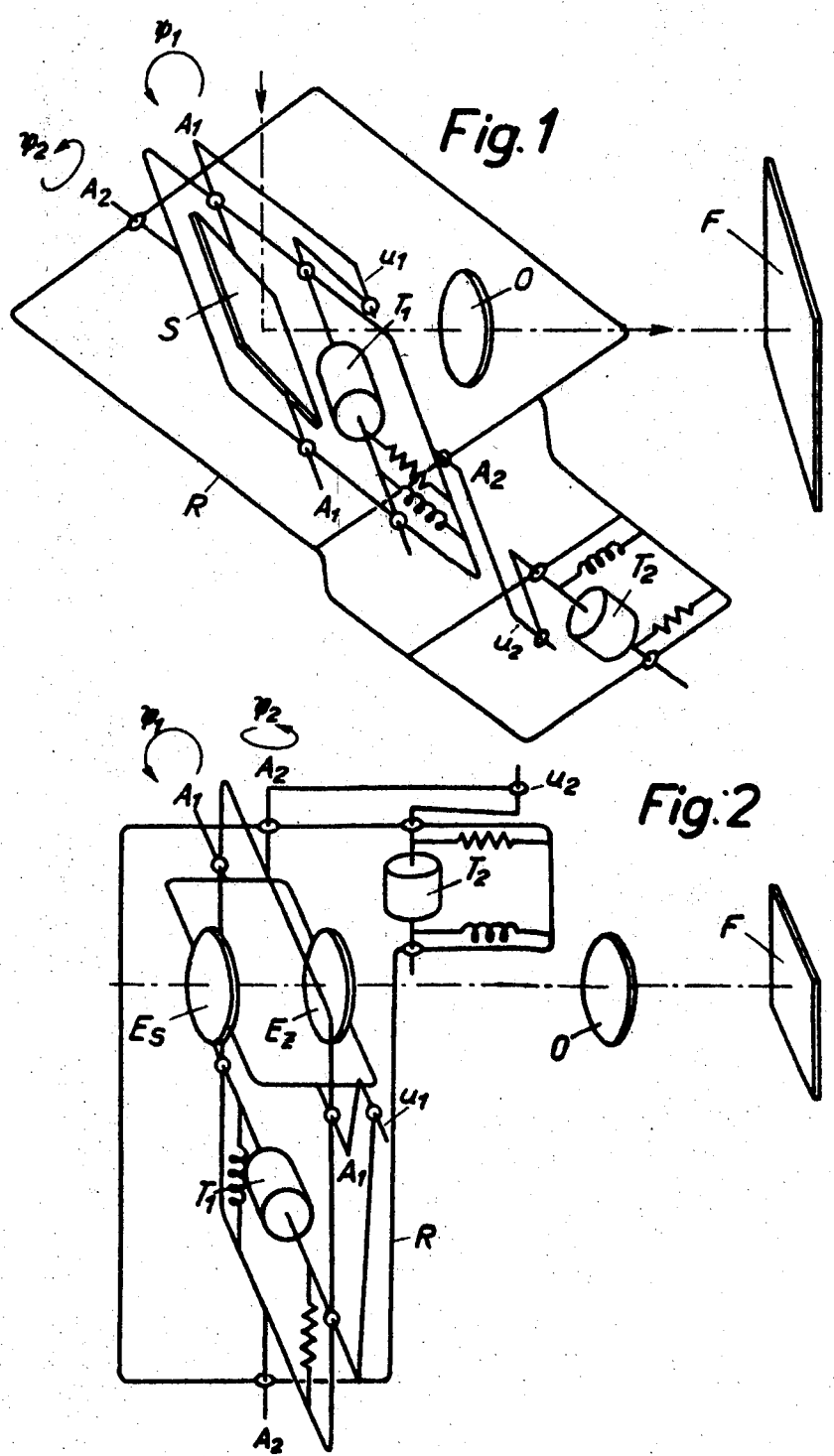

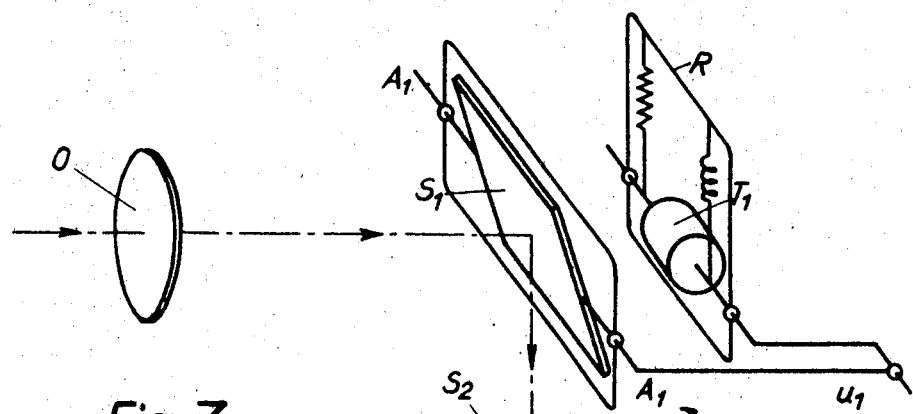
Fig. 7
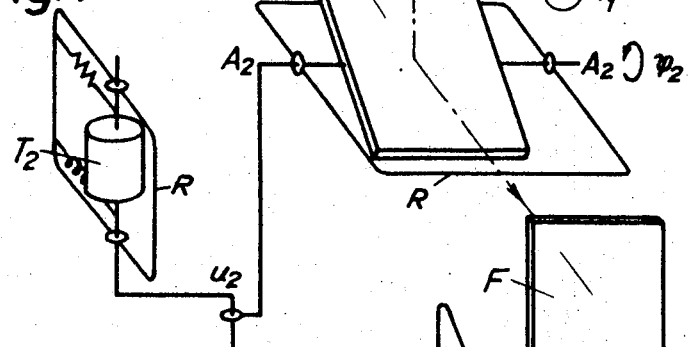
Fig. 8
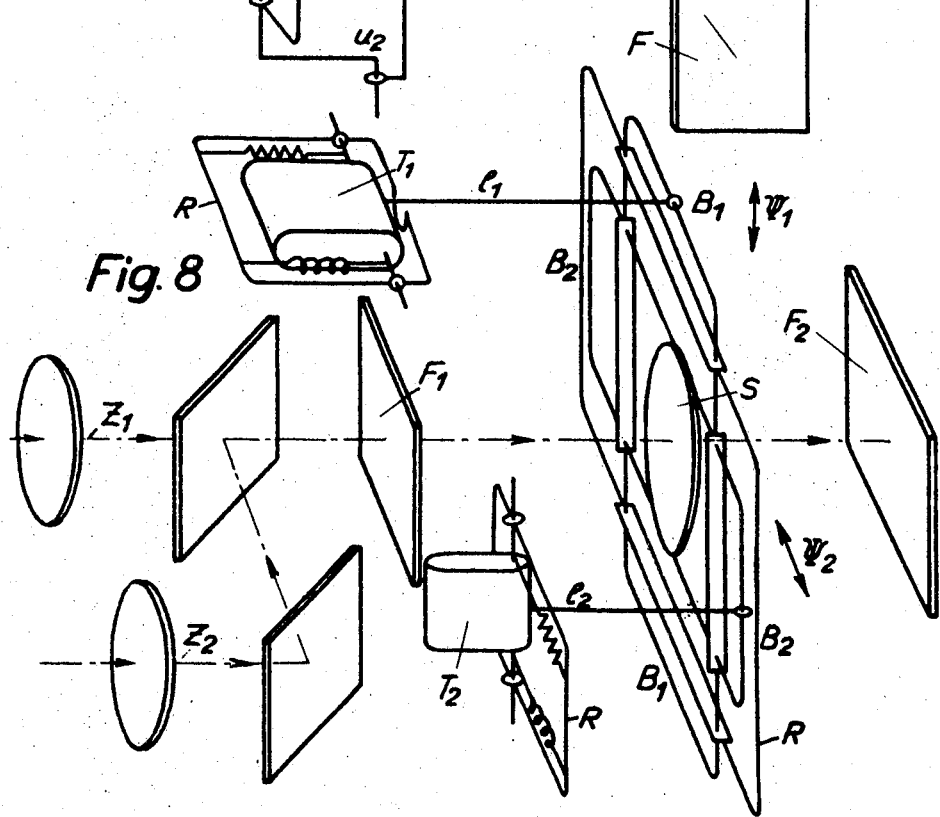

INVENTOR.
Daniel Gross
BY Alvin Browdy
Attorney

DEVICE FOR STABILIZING THE IMAGES OF OPTICAL INSTRUMENTS AGAINST MOVEMENT CAUSED BY VIBRATION OF THE INSTRUMENT

This application constitutes a continuation-in-part application of U.S. Ser. No. 602,340 filed Dec. 16, 1966, entitled Device For Stabilizing the Images of Optical Instruments Against Movement Caused By Vibration of the Instrument, now aboandoned.

In the past, stabilization of optical instruments has often been achieved through the use of gyroscopically stabilized platforms which mount the optical instrument. Also, it is known to use a gyroscopically stabilized compensating optical system which is introduced into the ray path of an optical instrument. The compensating optical system is designed in such a way as to stabilize the images against any vibration induced movements of the optical instrument.

Finally, stabilizing electro-optical systems are known to the prior art which make use of an array of photocells within the focal plane to lock the movement of an optical instrument to that of a chosen target object. These photocells actuate an electronic system which in turn energizes the electromechanical positioning motors of a compensating optical system or of the optical instrument itself.

All of these stabilizing devices known to prior art have two drawbacks. First they all employ electromechanical components which need a power supply, and second, no vibration stabilized panoramic movement is feasible.

The present invention employs inertia optical systems which are axially mounted in a way to produce loosely coupled but aperiodically damped movements within an optical instrument. These inertia optical systems are balanced out so as to be in an indifferent equilibrium regardless of the position of the optical instrument. Upon rotational vibrations of the optical instrument, these inertia optical systems stay approximately at rest and deflect the ray path within the optical instrument in a way to stabilize it with respect to a fixed focal plane or to an inertial frame of reference. The application field of this invention includes field glasses, hand held photographic, cinematographic and television cameras, as well as any optical instruments, which have to be mounted on ships, air planes, helicopters, motor cars, tanks and the like.

It is a primary object of this invention to stabilize the images of optical instruments against vibration of said instruments. This means that the optical line of sight stays approximately at rest during the vibration induced movements of the optical instrument.

Another object of this invention is to insure that the optical line of sight of an optical instrument follows any slow movements of the optical instrument such as those which occur in locating and retaining an object in the field of view.

It is a further object of this invention to stabilize the line of sight of goniometers and stereoscopic range finders against rotational vibrations around the axis perpendicular to their measuring plane. Another object of this invention is to stabilize the line of sight of teleoptical instruments, like photographic and cinematographic cameras or fieldglasses and telescopes, against rotational vibrations around the two axes perpendicular to their line of sight.

A further object of this invention is to stabilize the line of sight of wide-angle, cinemascope and cinerama cameras against rotational vibrations around any three axes perpendicular to each other.

A still further object of this invention is to provide a device for stabilizing the images of optical instruments subjected to vibration, in at least 1 degree of translational and/or rotational freedom.

Figure 11:
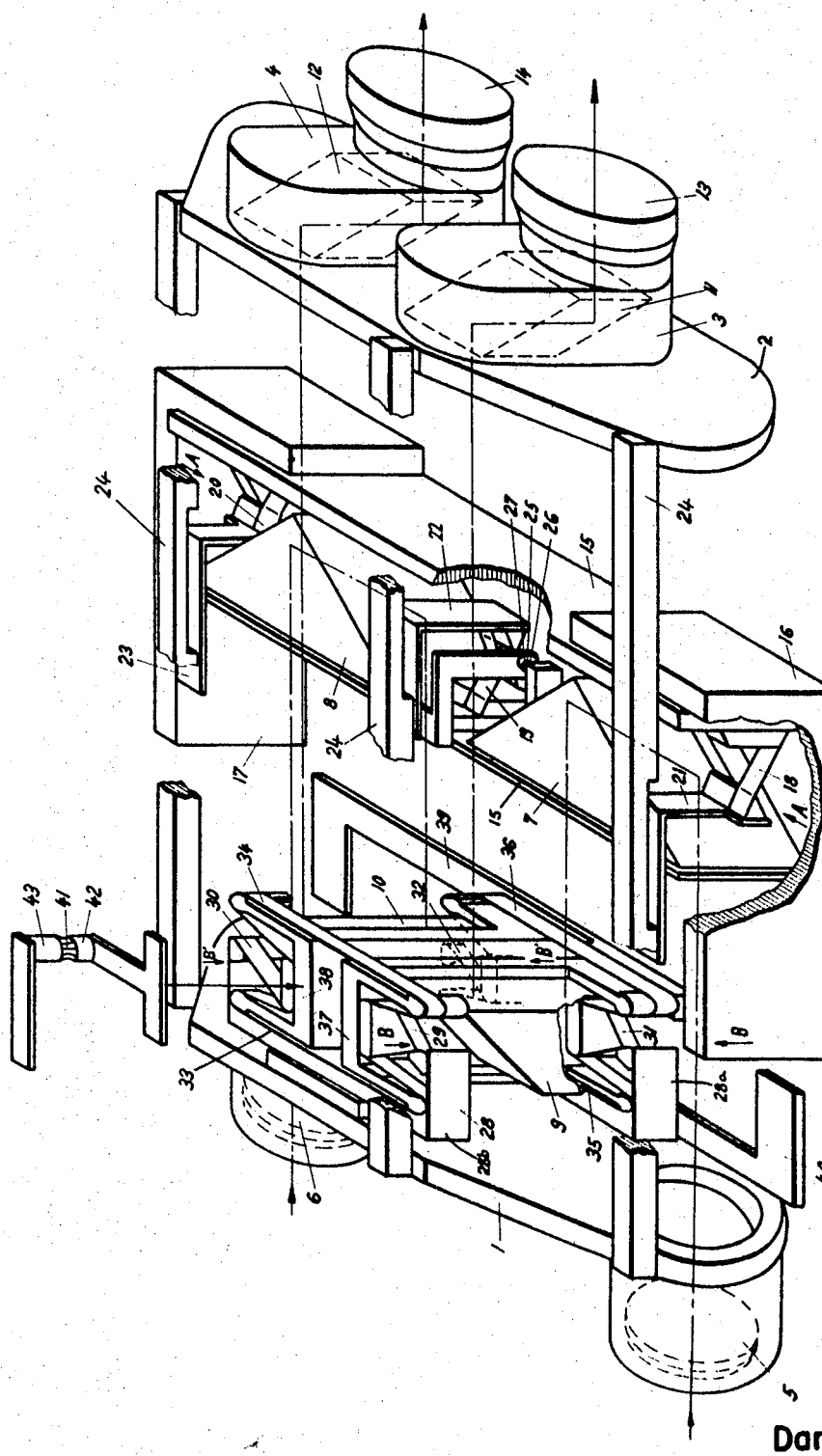
Figure 12:
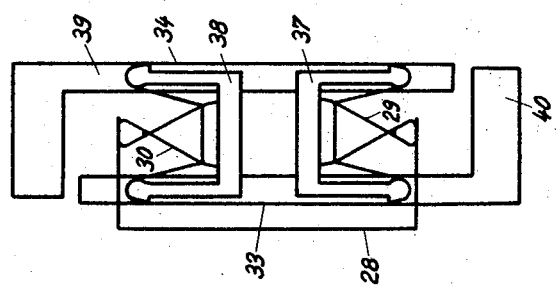

These and other objects of the invention will be apparent from the following detailed description, read with reference to the FIGS. of the accompanying drawings, wherein:

FIGS. 1—10 are schematic illustrations of teleoptical instruments incorporating the present invention;

FIG. 11 is a partially sectional cutaway view illustrating a field glass incorporating the present invention; and FIG. 12 is a plan view of a mounting unit for FIG. 11.

GENERAL CONSIDERATIONS

The invention is based chiefly upon the following considerations.

The moment of inertia of inertia optical systems is used to obtain the stabilization of the line of sight of the optical instrument in an inertial frame of reference. The stabilization, however, is not equally effective for all frequencies and amplitudes at or with which the instrument is moved or vibrated. In particular, both the inertia optical systems and the line of sight of the optical instrument should follow the slow movements involved in locating and retaining subjects in the field of view and thus preserve the intrinsic image-forming geometry for any position of the optical instrument. To this end, the inertia optical systems are each connected to the optical instrument by an elastic and attenuating link, whereby, circumstances permitting the degree of coupling can be adjusted. Although an optical instrument has 6 degrees of freedom of movement, as does every solid body, only $k$ degrees of freedom, where $k$ is generally less than 6, are compensated for in the manner of the invention.

with telcoptical instruments, which chiefly come into consideration, it is particularly important to compensate the 2 degrees of rotational freedom perpendicular to the line of sight of the instrument. Fundamentally, this compensation can be obtained by optically series connecting two mechanically decoupled inertia optical systems, each compensating a respective one of the 2 degrees of freedom. Three such inertia optical systems can be located optically in series to compensate for 3 degrees of freedom, etc. Another possibility is so to mount in a bearing an inertia optical system that compensates a first degree of freedom that the same system also compensates in the second degree of freedom, and whereby the 2 degrees of freedom of the inertia optical system are mutually mechanically decoupled. In every instance, all of the other degrees of freedom of the optical instrument must remain decoupled from the compensated degrees of freedom of the inertia optical system or systems.

As a first elementary case, only compensation in a single degree of rotational freedom will be considered.

In order to mechanically decouple the noncompensated degrees of freedom of the instrument case from the compensated degree of freedom of the inertia optical system, the latter is mounted in bearings on an axle passing through its center of gravity. The necessary bearing mounting can be obtained, as will be subsequently described in connection with FIG. 11, by crossed tape bearings or with sliding or rolling mechanical bearings held together by their shape or by force, or by bending or torsion of one or more connecting parts, or by electro- or magnetostatic forces, in each instance with or without hydrostatic bearing relief, or by pressured air bearings.

In order to achieve sufficient generality we consider an inertia optical system which consists of an inertia system, a compensating optical system, both mounted for movement within the instrument case and a transmission, which couples both subsystems, such that there is again exactly one rotational degree of freedom which causes said inertia optical system to move within the instrument case.

With a time-dependent angle of vibration of the instrument case of $\alpha(t) = \alpha_o \sin \omega t$ there is an angle of deflection $\Lambda(t)$ of the inertia system, wherein both angles are measured perpendicular to the axis of rotation and with respect to an inertial frame of reference. It will be assumed that the disturbing frequency of vibration $\omega$ is greater than $2/\tau$, where $\tau$ is the time constant of the inertia optical system with respect to the deflections perpendicular to the axis of rotation. The inertia optical system is coupled to the instrument case by an elastic link having the elasticity constant $\xi$ and an attenuating link with the attenuation constant $\mu$. The two links may be combined into a single link. The required elastic coupling particularly can be obtained by bending metallic tapes or by other mechanical springs or by electric or magnetic forces. The required attenuating coupling can be particularly obtained by Newtonian friction of a high viscosity liquid or by other internal or surface friction of rigid bodies, liquids, or gases, or by dissipative electromagnetic damping forces.

The moment of inertia of the inertia optical system with respect to its axis of rotation is $\Omega$. For the fundamentally important aperiodic attenuation, the following relationship holds true:

$$\frac{1}{\tau} = \mu = \left(\frac{\xi}{\Omega}\right)^{1/2} \quad (1)$$

solving the differential equation of motion for $\omega \gg 2/\tau$ and disregarding the phase constant, we have:

$$A(t) \cong \frac{2\mu\alpha_0}{\omega} \cos \omega t \quad (2)$$

The other fundamental case—compensation in one degree of translational freedom—is similarly handled, when the corresponding mass M is taken into account, instead of the moment of inertia $\Omega$. The inertia system, mechanically guided in the degree of translational freedom, is deflected the distance $L(t)$ as a result the vibration $X(t) = X_0 \sin \omega t$. Thus, $$L(t) = \frac{2\mu X_0}{\omega} \cos \omega t \quad (2a)$$

The compensation of translational movement, which can find application in close-range optics, will not be further mentioned.

When compensating a degree of rotational freedom, a vibration, having the angular frequency $\omega$ and the angular amplitude $\alpha_0$, an inertia system moves through the time-dependent angle of compensation $\alpha - A$ within the instrument case. This angle of compensation, in accordance with the particular embodiment or construction of the optical imaging system, which includes the compensating optical system, must be geared up or down by a ratio $u$ that is characteristic for the optical imaging system, in order that the compensating optical system, thus rotated through an angle $\psi$, effects the required stabilization of the line of sight. Thus, $$\psi = \frac{A - \alpha}{u} \quad (3)$$

The transmission may be designed as a mechanical lever system or as a friction gear drive, or as a hydraulic, pneumatic, or electromechanic control with or without electronic amplification. Further, the transmission may also be mechanically identical with the attenuating or elastic links. The additional moment of inertia $\omega_a$ of the transmission and the compensating optical system must, multiplied by $u^{11}$, be taken into account in the differential equation of motion of inertia system. If $u=1$ is possible, the inertia system and the compensating optical systems may be rigidly attached to each other and there is no transmission, as in the case in the specific embodiment of the alleged invention. In this case $\psi = A - \alpha$ and $\Omega_a = 0$ holds.

By means of compensating optical systems as mentioned above, which with an angle of vibration $\alpha$ rotate an angle $\psi$ in the instrument case, it is possible, absolutely analogously to the known methods, as they are employed with gravitationally or gyrostabilized compensating optical systems, to stabilize the vibration of the optical line of sight of optical instruments, whether with virtual images by holding the angle-image-observer-optical instrument constant or otherwise the angle-image-observer-object constant as in the specific embodiment, or whether with real images by holding the real images stationary with respect to the optical instrument.

It will be understood that with these optical instruments the mechanical line of sight generally will not coincide with the optical.

The further case is also important, wherein $m$ component instruments mechanically coupled together by guides and subject to the same vibration are to be stabilized in order that the respective angles of the optical lines of sight of the individual component instruments in regard of each other remain constant at all times. One solution is to split the light beam or to fuse the light beam after or before the compensating optical system or systems. Another solution which is the one chosen in the specific embodiment of the invention, shown in FIG. 11, is to so mechanically guide the component compensating optical systems of the component instruments that they execute corresponding movements during all vibrations that occur. The mechanical guides may couple together several component inertia optical systems as in FIG. 11, or a single inertia system couples together a plurality of compensating optical systems. The guides may also be partly mechanically identical with the transmissions. The field of application for the above includes field glasses, motion-picture cameras with two or more synchronously operating individual cameras, stereocameras, and instruments for measuring relative angular distances, such as sextants and telemeters.

SPECIFIC EMBODIMENTS OF THE COMPENSATING OPTICAL SYSTEMS

It should be recalled that optical systems which compensate the movement of a ray path through their own movements within an optical instrument are known to prior art. They are only described to further disclose different embodiments of the alleged invention.

The case in which the compensating optical system causes a rotation of the parallel light beam will first be discussed. It will be assumed that the optical instrument is moved through the angle $\alpha$ by vibration, the compensating optical system thus rotating through the angle $\psi$, displacing the light beam through the angle $V\psi$. If $V_1$ is the magnification of an afocal, fixed optical system from which the beam to be compensated emerges, and $V$ the magnification of the compensating afocal optical system, then the following holds true, with respect to the optical instrument, for the stabilization of the emerging beam forming a virtual image:

$$\psi + V(V_1\alpha - \psi) = 0$$

Using the above and relationship (3) together, we have $$u = \frac{V-1}{VV_1}\left(1 - \frac{A}{\alpha}\right) \quad (4)$$

For $\frac{A}{\alpha} \ll 1$, that is, for $\omega \gg \frac{1}{2\tau}$, we have $$u \cong \frac{V-1}{VV_1} \quad (4a)$$

When the compensating optical system is located in front of the optical instrument, $V_1 = 1$ holds, from which we have $$u \cong \frac{V-1}{V} \quad (4b)$$

For $V = -1$, as, for example, is the case when using a plane mirror, we have $$u \cong 2$$

For $V = -1$, namely using a Boscovich prism having a variable wedge angle and a refractive index $n$, we have from the relationship (4a)

$$u \cong -\frac{2-n}{(\eta-1)V_1}$$

On the other hand, if $u=1$, then $$V \cong \frac{V-1}{V} \quad (4d)$$

And for $V=1$ one gets $V_1 \cong 2$. If the magnification of the system is near 1, then $$V = 1 + \epsilon, \text{ where } \epsilon \ll 1.$$

An example is the unsymmetrical path of rays in an achromatic prism. From the relationship (4a), $u V_1 = \epsilon$ (4e). This is of no general interest, because neither $u \ll 1$ nor $V_1 \ll 1$ offers any practical advantages.

Further, the case where the compensating optical system shifts a convergent beam will be considered.

If a fixed lens, producing a convergent beam, has a focal length $f$, the image of the lens moves a distance $s$ in the focal plane when the optical instrument vibrates and moves through the angle $\alpha$, whereby $$s = f \tan \alpha \cong f\alpha \quad (5)$$

To obtain stabilization with a real image the optical axis of the convergent beam also must be shifted parallel with respect to the fixed normal to the focal plane the same distance $s$. To transform the translation movement into a rotational movement of a compensating optical system, the lever length $b$ of this system must be such that the lever end describes a circular path $\Psi$. With the statement $$\Psi = l(\Lambda - \alpha) \quad (6).$$

and the displacement magnification $W$ at a distance $l$ from the axis of the system, there results from the relationship (5) the stabilization condition for small $\alpha$ (whereby $s$ along a straight distance can be approximated by $s = W\Psi$)

$$l = \frac{f}{w} \frac{\alpha}{\Lambda - \alpha} \quad (7)$$

For $W = -2$, which can be obtained using a Porroprism moved in the longitudinal direction of its hypotenuse, we have $$l = \frac{f\alpha}{2(\alpha - \Lambda)} \quad (7a)$$

Another possibility, with $W = \sqrt{2}$, arises from the use of a pentaprism moved in the plane and direction of the external angle bisector of the incoming and emerging rays, the latter being displaced parallel to the incoming rays.

By similarly using multiple mirrors and roof prisms, and such like, further possibilities for stabilization are made possible.

Other variations are possible wherein the rotation $\psi$ of the compensating optical system causes a displacement $s$ of the convergent light beam in the focal plane. If the magnification of such a system, analogous to $V$ and $W$, is defined as $s = u\psi$, then we have from the relationships (3) and (5) the stabilization condition $$u = \frac{U}{f}\left(\frac{\Lambda}{\alpha} - 1\right) \quad (8)$$

Further, the case will be considered in which the compensating optical system causes a rotation of the convergent light beam. This case has been chosen for the specific embodiment of FIG. 11.

This variation, which has the disadvantage that the real image formed by the lens is tilted about an angle of the orders $\alpha$ out of the focal plane, advantageously uses a catoptric system, as a mirror or particularly a Porroprism, for compensation. When the catoptric system is rotated through the compensation angle $\psi$, the light beam emerging from the lens is deflected through the angle $V\psi$ from its original direction, so that with a separation $g$ between the catoptric system and the focal plane, where $g < f$, the stabilization condition is $$f\alpha - V\psi g 0$$

Using the relationship (3) we have for $\psi$ and $\alpha$ both $<< 1$ $$u = \frac{-Vg}{f}\left(1 - \frac{\Lambda}{\alpha}\right) \quad (9)$$

For a Porroprism tilted perpendicularly to the line of sight and within the plane of its triangular surfaces $V = -2$ holds.

If an image forming compensating optical system is rotated through $\psi$, the stabilization condition in Gaussian space, with parallel incidence of rays, for $\omega >> 2/\tau$, from the relationship (3), and where $f$ is the focal length of the system and $g$ the separation between the axis of rotation and the fixed focal plane, is $$U = \frac{g - f}{\alpha g - f} \quad (10)$$

Further, the case will be considered in which the compensating optical system causes a displacement of the image that it forms.

If the system is moved the distance $\Psi = s$ parallel to the fixed focal plane, the stabilization condition, using relationships (5) and (6), is $$\frac{l}{f} = \frac{\tan \alpha}{\Lambda - \alpha} \quad (11)$$

For small $\alpha$ and $\omega >> 2/\tau$, we have $$l \cong -f$$

If the compensating optical system, separated from a fixed focal plane by a distance $g$, is rotated $\psi = \alpha u$, the compensation condition is $$u = \frac{f}{f - g}\left(\frac{\alpha}{\alpha - \Lambda}\right)$$

Finally, the case should be considered in which only the compensating optical system influences the incoming light beam.

In this case the compensation is equivalent to the position of rest of the compensating optical system with respect to an inertial frame of reference, when there are considered only the $k$ degrees of freedom which are to be compensated. The stabilization is thus $\alpha = -\psi$ and from the relationship (3) we have $$u - 1 - \frac{\Lambda}{\alpha} \quad (12)$$

Thus, it is unimportant whether the compensating optical system forms only a virtual or actually a real image on a focal plane lying within the system. In both instances the instrument case acts merely as a platform or support for the compensating optical system. To protect the compensating optical system against external influences, the optical instrument can be constructed as an instrument case with plane parallel windows.

Before considering the schematic illustrations of FIGS. 1—10, the invention will best be understood by first turning to FIGS. 11 and 12. These figures illustrate a specific embodiment of the invention used to stabilize a field glass against vibrations in the 2 rotational degrees of freedom perpendicular to the line of sight thereof. This stabilization is achieved by a first inertia optical system operative to compensate for the vibrations around a horizontal axis and a second inertia optical system composed of two subsystems which compensate for vibrations around a vertical axis. Both inertia optical systems are optically connected in series.

The basic components forming the instrument case or frame for the field glass of FIG. 11 consist of a front wall 1, a rear wall 2 which supports ocular units 3 and 4, and a mounting bridge 24 which extends between the front and rear walls.

The optical imaging system for the field glass can be traced by following the two optical ray paths thereof which intersect successively objectives 5 and 6 mounted on the front wall 1, horizontal Porroprisms 7 and 8, vertical Porroprisms 9 and 10, rhombic prisms 11 and 12 and oculars 13 and 14 which are mounted by the ocular units 3 and 4. The prisms 7, 8, 9 and 10 also constitute a compensating optical system as will be subsequently described.

Image erection is effected in a manner conventional to field glass units. By rotating the ocular units 3 and 4 around the optical axes at their exit points from the rear wall 2 there results as a consequence of the lateral shift within the rhombic prisms 11 and 12 a variation of the ocular distance.

The two prism pairs 7, 9 and 8, 10 are arranged at a close distance to each other and are positioned such, that the reflection in the horizontal prisms 7 and 8 takes place shortly before half the focal distance of the objectives 5 and 6 while the reflection in the vertical prisms 9 and 10 takes place shortly after half the focal distance of these objectives.

The horizontal inertia optical system employed for stabilization consists of a frame plate 15, the two prisms 7 and 8, and of two inertia units 16 and 17. The prisms and inertia units are mounted upon the frame plate 15, and the inertia units operate to enlarge the rotational moment of inertia of the horizontal inertia optical system with respect to the axis AA.

The horizontal inertia optical system is mounted upon the mounting bridge 24 by means of spring clips 21, 22 and 23. These spring clips in turn suspend crossed tape bearing 18, 19 and 20 which bear the horizontal inertia optical system. The outer bearings 18 and 20 pull in the direction of the objectives 5 and 6, while the inner bearing 19 pulls in the direction of the oculars 13 and 14. The spring clips assure that the necessary tension is maintained on the tape bearings.

The attenuating linkage is provided by a viscous material such as a viscous paste 25 which connects an arm 26 fastened to the frame plate 15 to an arm 27 fastened to the mounting bridge 24.

The vertical inertia optical system consists of two subsystems which are formed by a plate 37 which mounts the prism 9 and an inertia unit 39 and a plate 38 which mounts the prism 10 and an inertia unit 40. The subsystems are mounted by a spring clip 28 and crossed tape bearings. The spring clip 28 is mounted on the front wall 1, and includes two pairs of opposed spring arms 28a and 28b; the spring arms being arranged so that the arms of each pair pull against each other. The tensile force of the spring arms is transferred by two crossed tape bearing units each, 29, 30 and 31, 32 connected to each subsystem and by similarily connected pairs of parallel guiding tapes 33, 34 and 35, 36.

The inertia unit 39 and 40 mounted upon the plates 37 and 38 of each subsystem enlarge the rotational moment of inertia of the vertical inertia optical system with respect to the axes BB and B' B'. Both subsystem of the vertical inertia optical system are connected by means of the parallel guiding tapes 33, 34, 35 and 36 in such a way that only corresponding rotational movements around said axes BB and B' B' are possible.

As in the case of the horizontal inertia optical system, the attenuating linkage for the vertical inertia optical system consists of a viscous paste or similar material 41 which connects an arm 42 fastened to the subsystem plate 38 to an arm 43 fastened to the front wall 1.

Both the vertical and the horizontal inertia optical systems are suspended in such a manner that they are in indifferent equilibrium irrespective of the position of the instrument case or frame. The crossed tape bearings guarantee a movement of the inertia optical systems which is free from play. The bending elasticity of the bearing tapes causes a weak restoring moment which is proportional to the deflection angles from the rest positions of the inertia optical systems. Therefore the bearing tapes constitute an elastic link between the inertia optical systems and the vibrated instrument case.

The attenuating constants of the attenuating linkages are adjusted by proper choice of the material and the amount of viscous pastes 25 and 41. This is done in such a way as to give both inertia optical system an approximately aperiodically damped movement with a typical time constant of about one second.

FIGS. 1—10 show ten possible variations of the invention employing the principles described in the foregoing, for stabilizing the movement of the images of optical instruments, caused by vibration of the instruments. The purpose of the stabilization is to push back the limits to which the instruments can work. The Figures schematically illustrate the apparatus of the invention, with all parts unimportant to the invention not shown. Thus, of the fixed members of the optical instrument only those frame members required for mounting the inertia optical system are illustrated and indicated by the reference letter R. These variations will be explained with reference to the foregoing sections of the specification.

The embodiments of FIGS. 1—4 relate to teleoptical instruments that form a real image with a medium to large angular field on a focal plane lying within the instrument.

In the embodiment of FIG. 1 a plane mirror S, acting as the compensating optical system, is mounted in front of the imaging lens 0. The focal plane is F. The mirror is rotated, perpendicular to its plane, about two mutually perpendicular axles $A_1$ and $A_2$ through respective angles $\psi_1(t)$ and $\psi_2(t)$ corresponding to the relationship (4d) above, by the inertia systems $T_1$ and $T_2$ through the respective transmission systems $u_1$ and $u_2$. The arrangement permits the aperture and shutter to be operated without restriction, permits variation of the focal distance from the zoom lens and such like, since these remain fixed.

In the variation of FIG. 2 an afocal system having a magnification $V > 1$ is used.

The system may be a Galilean telescope, for example, having a convergent optical unit $E_s$ and a divergent optical unit $E_2$ mounted in front of the imaging lens 0. The units $E_s$, $E_z$ are rotated, perpendicularly to the line of view, about two mutually perpendicular axles $A_1$ and $A_2$ through respective angles $\psi_1(t)\psi_2(t)$ corresponding to the relationship (4b) above, by the inertia system $T_1$ and $T_2$ acting through the respective transmission system $u_1$ and $u_2$. The solution also permits operations on the lens during the imaging process, but it requires the additional optical units $E_s$ and $E_z$, which are difficult to correct for a wide angle lens. An advantage of this variation lies in the direct vision of the instrument. The variation according to FIG. 2 therefore is chiefly suitable for still and motion-picture making cameras employing normal or zoom lenses, as well as for terrestrial telescopes. In the latter instance the optical units $E_s$ and $E_z$ of the Galilean telescope is preferably replaced by a Newtonian telescope, in order to obtain simultaneously an erect image.

In the variation according to FIG. 3 the lens 0 of the optical instrument is used as the compensating optical system. To this end, the lens can be shifted in two mutually perpendicular directions $B_1$ and $B_2$ through the respective distances $\Psi_1(t)$ and $\Psi_2(t)$, parallel to the focal plane F. The lens 0 and the necessary levers $l_1$ and $l_2$ of the inertia systems $T_1$ and $T_2$ operate in accordance with the relationship (11) above. The solution is chiefly suitable for lenses that do not have to be mechanically set during the imaging process, as is the case with some cameras, photogrammetry cameras, infrared noctovisers, and periscopes, for example.

Figure 4:
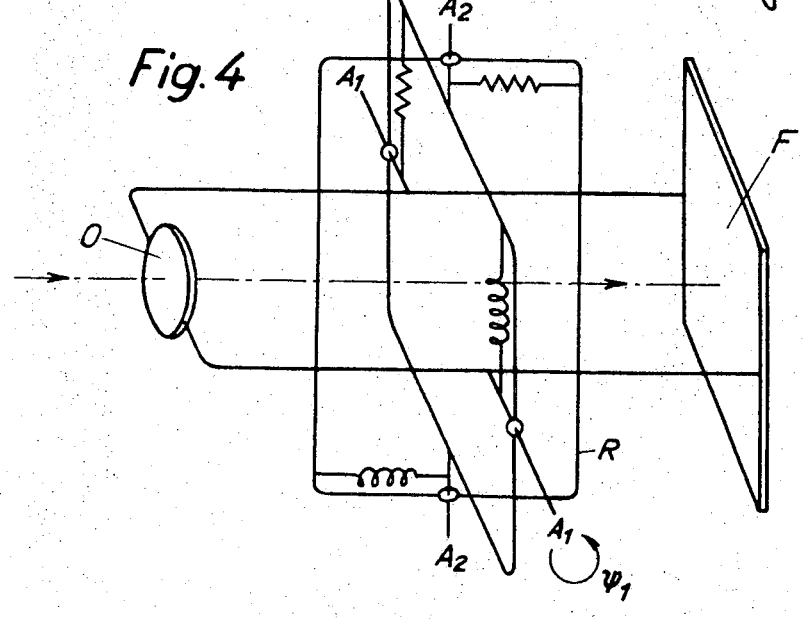

In the variation of FIG. 4 the lens 0 and the focal plane F as a unit comprise the compensating optical system. The system 0 and F is rotated, perpendicular to the line of view, about the mutually perpendicular axles $A_1$ and $A_2$ through the respective angles $\psi_1(t)$ and $\psi_2(t)$. For $\omega >> 2/\tau$ the inertia system can be identical with the system O and F, because $u \cong 1$ in accordance with relationship (12) above. The transmissions $u_1$ and $u_2$ are thus eliminated. This highly precise variation is chiefly suitable for larger optical instruments, in which mechanical settings are not necessary during the imaging process, as is the case, for example, with photogrammetry cameras, long-range cameras on board airplanes or ships, or astronomical-photographic or photoelectric telescopes in airplanes or stratosphere ballons.

Figure 5:
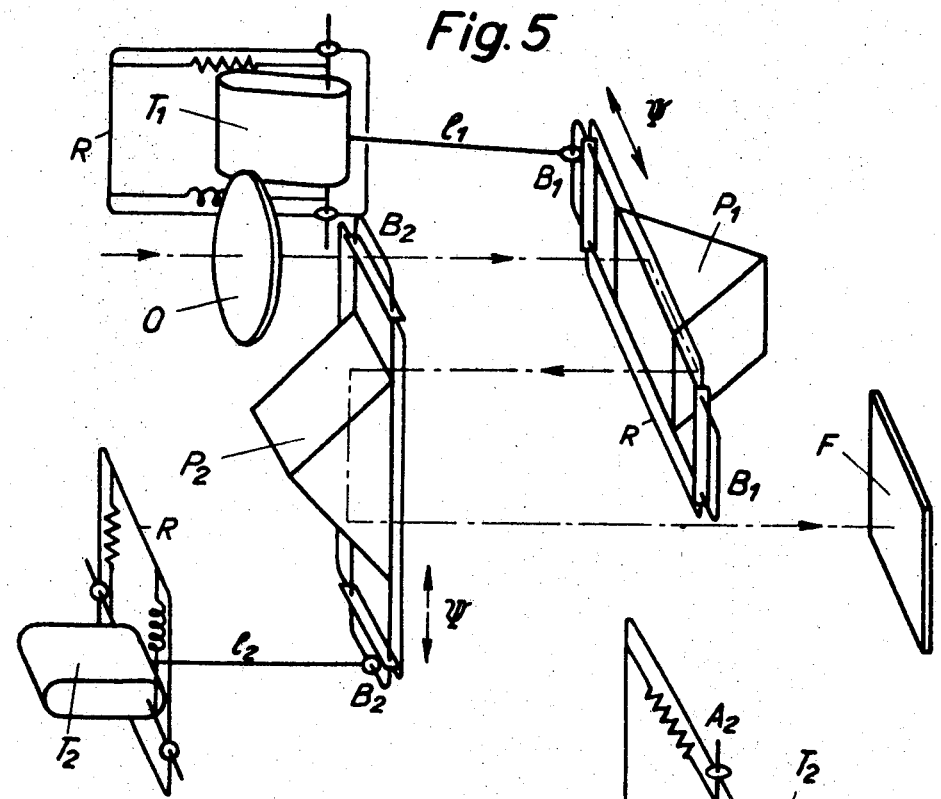

The variations of the invention according to FIGS. 5 and 7 relate to teleoptical instruments in which a real image with a small angular field is formed on a focal plane located within the instrument. These solutions likewise are based upon the principles explained in the earlier sections. Because of the small angular field, it is possible, as against the embodiments of FIGS. 1—4, to employ additional compensating optical systems.

In the variation of FIG. 5 two compensating optical systems $P_1$ and $P_2$ are located in the converging beam of rays between the lens O of the optical instrument and its focal plane F. The systems $P_1$ and $P_2$ are movable, perpendicular to the paraxial ray of the image forming light beam, in the respective directions $B_1$ and $B_2$ by respective inertia systems $T_1$ and $T_2$ acting through respective levers $l_1$ and $l_2$. They are moved the respective distances $\Psi_1(t)$ and $\Psi_2(t)$ corresponding to the relationship (7) above. The systems $P_1$ and $P_2$ may comprise Porroprisms, for example. The solution is particularly suitable for small image areas on the focal plane F, when it is desired to have an erect image and a shortened beam path. The variation thus is useful for hand telescopes, telescopes mounted on vehicles, and similar optical instruments.

Figure 6:
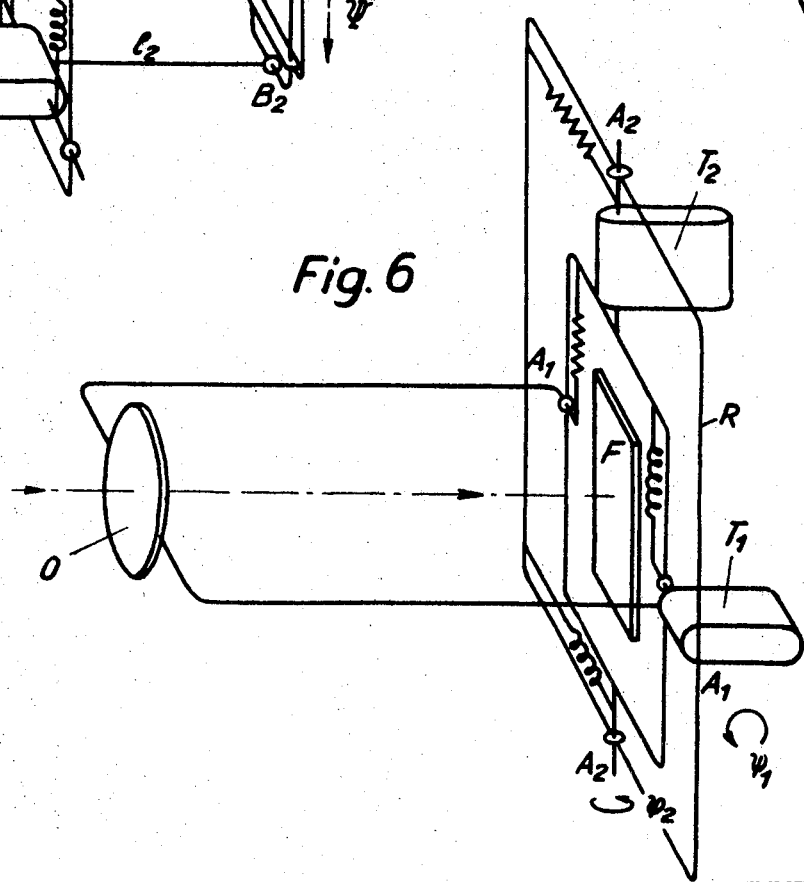

In the variation of FIG. 6 the compensating optical system is formed by the image forming lens O of the optical instrument. To this end, the lens is mounted, by bearing means previously explained, to be rotatable about two mutually perpendicular axles $A_1$ and $A_2$, which lie in the focal plane F, the latter being fixed. For $\omega >> 2/\tau$ and $u = 1$, the inertia and compensating optical systems corresponding to the relationship (10) above are the same. The solution is principally suitable for small angular fields and compensation angles. With large optical instruments, because of the large moment of inertia, the compensation of very low vibration frequencies ω is possible. Further, the variation is suitable for very precise construction and requires no additional optical units. It is useful principally in telescopes for visually observing the heavens and the earth from airplanes, as well as with powerful teleobjectives of hand-held cameras. For optical instruments on ships and land vehicles the variation is expediently used in conjunction with a gravitational stabilization system, the inertia compensation system being intended to be effective on the residual vibrations of small amplitude.

In the variation of FIG. 7 the compensating system is comprised of two plane mirrors $S_1$ and $S_2$ mounted in the light beam path between the image forming lens O of the optical instrument and its focal plane F. The plane mirrors are rotated about the axles $A_1$ and $A_2$ by the respective inertia systems $T_1$ and $T_2$ acting on the respective transmissions $u_1$ and $u_2$. The resulting compensation corresponds to the relationship (9) above. This solution can be used alone or in combination with another. The arrangement deflects the light beam; and therefore, where the beam must be deflected, for whatever reason, no additional optical parts are required. The solution is suitable only for small angles of compensation, since the image, as in the above described case, is tilted out of the focal plane F. The variation is usable with reflective and refractive telescopes, wherein the secondary mirrors acting as the compensating optical stabilize any vibrations whatever of the mounting or of the telescope tube.

Figure 9:
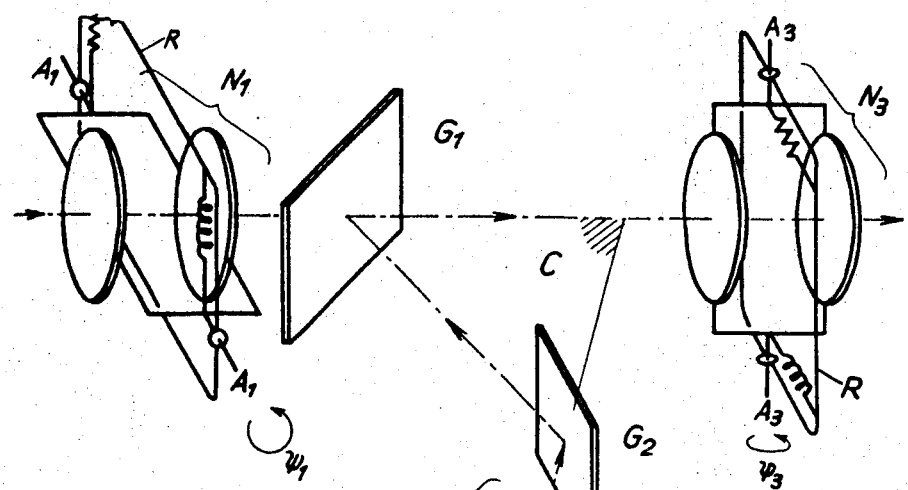
Figure 10:
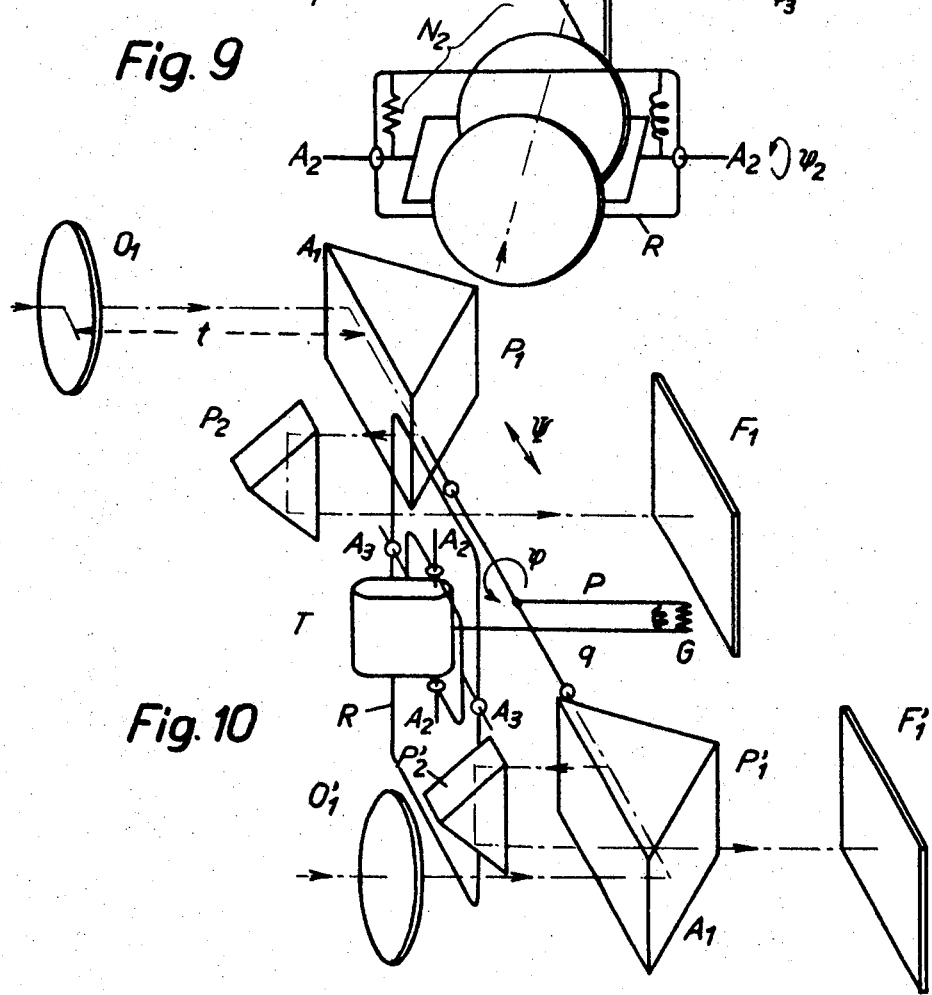

The embodiments of FIGS. 8 to 10 relate to teleoptical instruments consisting of m optical components.

The variation of FIG. 8 is intended for a telemeter, such as one having, for example a split-image system. Since in such instruments the angular difference between the two incident component light beams $Z_1$ and $Z_2$ remains small, compensation can be effected after their fusion in the focal plane $F_1$. The compensation can be obtained, for example, as shown, by mounting a convergent, compensating optical system S for movement, perpendicular to the paraxial ray, in two mutually perpendicular directions $B_1$ and $B_2$ through the respective distances $\Psi_1(t)$ and $\Psi_2(t)$, and by further imaging the image formed on the focal plane $F_1$ of the optical instrument on a second focal plane $F_2$, where it can be viewed through an eyepiece not shown in FIG. 8. To obtain the required compensation, the system S is moved by the levers $l_1$ and $l_2$, in accordance with the relationship (11) above, acted upon by the inertia systems $T_1$ and $T_2$. A telemeter of this kind can be used for measuring the target distance for fire arms. The invention can also be employed with sextants used for air and marine navigation, for example. Since sextants must measure arbitrarily large angles, such as 0°—120°, compensation in $k=3$ degrees of freedom is necessary.

A suitable embodiment is shown in FIG. 9. In this variation two afocal Newtonian systems $N_1$ and $N_2$ compensate, in the manner previously explained in connection with the relationship (4b) above, the vibrational components occurring perpendicular to the plane of the angle C. The systems $N_1$ and $N_2$ are mounted, by bearing means previously explained, to be rotated about the respective axles $A_1$ and $A_2$ through respective angles $\psi_1(t)$ and $\psi_2(t)$, by respective inertia systems $T_1$ and $T_2$ acting on transmissions $u_1$ and $a_2$. The two component light beams are combined, in accordance with the principle of Hadley's sextant, by two fixed mirrors $G_1$ and $G_2$.

A third Newtonian system $N_3$ compensates, likewise in accordance with the relationship (4b) above, for the vibrational components lying in the plane of the angle C by rotating through an angle $\psi_3(t)$, and thus cooperates with the systems $N_1$ and $N_2$.

The invention is also applicable to field glasses, scissor pattern binoculars, hand telemeters operating according to the principle of depth detection, and similar optical instruments. Such an embodiment is shown in FIG. 10 and is particularly suitable for field glasses.

In FIG. 10 the two fixed lenses $O_1$ and $O_1'$, having each a focal length f of the optical instrument, form each a real image from the respective converging beams on respective focal planes $F_1$ and $F_1'$. The compensation of the vibrations in the degrees of rotational freedom about the axles $A_1$ and $A_2$ occurs in accordance with the principles laid down in the introductory sections. In both instances prisms $P_1$ and $P_1'$ are used as the compensating optical systems. The prisms $P_2$ and $P_2'$ are fixed. Nevertheless, it is possible by a slight rotation to adjust the eyepiece distance, insofar as this rotation is suited to the eyepiece tube and to the prisms $P_1$, $P_1'$, $P_2$ and $P_2'$. The stabilization arising from a movement for a distance $\Psi(t)$ along the axle $A_1$ occurs in accordance with the relationship (7a) above in the manner described in the theoretical introduction. The length $l=AG$ necessary for this purpose of lever q causes, by means of the lever p, the movement $\Psi(t)$. The lever p is rigidly connected to the axle $A_1$, and the lever q appears as a component of the inertia system T. The stabilization caused by rotation about the axle $A_1$ through the required angle $\Psi(t)$ with the required transmission ratio occurs through the same levers p and q, in accordance with the relationship (9) above. The inertia system T is mounted for rotation in the 2° of rotational freedom by the axles $A_2$ and $A_3$, which each pass through the center of gravity, located in the inertia system T, of the inertia and compensating optical system. In order to obtain a simultaneous compensation in both degrees of freedom, as in the previous forms of the invention, the distance $l$ and $l=f-g$, corresponding to the relationships (7a) and (9) above, must be suitably chosen. An elastic and attenuating link G connects together the levers p and q, whereby the required coupling of the entire system with the optical instrument is achieved, since the axles $A_1$ and $A_2$ do not coincide.

The above-described embodiments being exemplary rather than limitative, the scope of the invention is defined by the appended claims.

I claim:

1. In an optical instrument for viewing objects along a line of sight including an instrument frame and optical imaging means having a focal plane, said optical imaging means being mounted upon said instrument frame, the improvement comprising a stabilizing unit including first and second inertia optical units mounted upon said instrument frame and balanced to remain in equilibrium irrespective of the position of the optical instrument, each said inertia optical unit including a support, at least one compensating optical means mounted upon said support, said compensating optical means being optically connected in series with said optical imaging means to form an optical imaging system for said optical instrument, at least one inertia mass mounted upon said support, and mounting means for mounting said support on said instrument frame for a limited degree of rotational movement about an axis perpendicular to said line of sight and passing through the center of gravity of said inertia optical unit in response to movement of said optical instrument, said mounting means including bearing means elastically coupling said supports for said first and second inertia optical units to said instrument frame and operating to provide limited relative movement between each said support and instrument frame and attenuating damping means coupling said supports to said instrument frame, said damping means operating to resist movement of said supports relative to said instrument frame, the bearing means for elastically coupling the support for said first inertia optical unit to said instrument frame including a plurality of spring clip means secured to said instrument frame, and first elastic cross tape bearing means tensioned by said spring clip means and extending between the support for said first inertia optical unit and each said spring clip means, certain of said first elastic cross tape bearing means operating to bias said support in a first direction and the remaining first cross tape bearing means operative to bias said support in a direction opposite to said first direction, the support for said first inertia optical unit being mounted for limited rotational movement about a horizontal axis perpendicular to said line of sight and the support for said second inertia optical unit being mounted for limited rotational movement about a vertical axis perpendicular to both said horizontal axes and said line of sight, said support for said second inertia optical unit including first and second mounting plates, an optical compensating unit mounted upon each such mounting plate and connected optically in series with said optical imaging means, an inertia mass mounted upon each mounting plate, and connecting means extending between said first and second mounting plates to join said mounting plates for corresponding rotational movement, the bearing means for elastically coupling the support for said second inertia optical unit to said instrument frame including second spring clip means connected to said instrument frame, and second elastic cross tape bearing means tensioned by said second spring clip means and extending between said first and second mounting plates and said second spring clip means, said second elastic cross tape bearing means operating to bias said first and second mounting plates in opposite directions.

2. The optical instrument of claim 1 wherein the attenuating damping means coupling said support for said first inertia optical unit and the second support for said second inertia optical unit to said instrument frame consists of a viscous paste.

3. The optical instrument of claim 1 wherein said first cross tape bearing means operate to bias said support for said first inertia optical unit in opposite directions longitudinal of said optical instrument and said second cross tape bearing means operate to bias said first and second mounting plates in opposite directions transverse of said optical instrument.